(12) United States Patent
Middleton

(10) Patent No.: US 6,176,697 B1
(45) Date of Patent: Jan. 23, 2001

(54) APPARATUS FOR THE TREATMENT OF PLASTIC MATERIALS

(75) Inventor: Ashley Paul Middleton, Somerset (GB)

(73) Assignee: Middleton Engineering Limited, Somerset (GB)

( * ) Notice: Under 35 U.S.C. 154(b), the term of this patent shall be extended for 0 days.

(21) Appl. No.: 09/186,010

(22) Filed: Nov. 4, 1998

Related U.S. Application Data

(62) Division of application No. 08/921,728, filed on Aug. 27, 1997, now Pat. No. 5,906,779.

(30) Foreign Application Priority Data

Aug. 30, 1996 (GB) .................................................. 9618223

(51) Int. Cl.[7] ...................................................... B29B 7/00
(52) U.S. Cl. ............................ 425/202; 425/205; 100/97; 100/215
(58) Field of Search .................................... 425/202, 205, 425/449, 412, 149, 145; 100/97, 215

(56) References Cited

U.S. PATENT DOCUMENTS

| 4,448,737 | * | 5/1984 | Johnson | 264/53 |
| 5,317,965 | * | 6/1994 | Wildes et al. | 100/42 |
| 5,494,626 | * | 2/1996 | Middleton | 264/115 |
| 5,664,491 | * | 9/1997 | Maki et al. | 100/41 |

* cited by examiner

*Primary Examiner*—Harold Pyon
*Assistant Examiner*—Joseph S. Del Sole
(74) *Attorney, Agent, or Firm*—Melvin I. Stoltz

(57) ABSTRACT

Expanded or foamed plastic material is fed into a hopper containing a first auger having a cutting function. The first auger is driven by an electric motor and cuts the plastic material into pieces which are discharged from the hopper into a vertical chamber. The vertical chamber contains a second auger driven by an electric motor. The pieces of plastic material are compressed by the second auger and delivered into a chamber which serves as the inlet end of a horizontal friction chute. The plastic material in the chamber is compressed by a hydraulic ram which forces the compressed plastic material along the friction chute.

3 Claims, 4 Drawing Sheets

APPARATUS FOR THE TREATMENT OF PLASTIC MATERIALS

This application is a divisional application of U.S. Ser. No. 08/921,728, filed Aug. 27, 1997 entitled Method and Apparatus for the Treatment of Plastic Materials now U.S. Pat. No. 5,906,779.

FIELD OF THE INVENTION

This invention relates to a method and apparatus for the treatment of expanded and foamed plastic materials, for example, polystyrene, particularly to enable them to be recycled.

In U.S. Pat. No. 5,494,626, to which reference should be made, there is described and claimed a method for the treatment of expanded or foamed plastic material, said method comprising the following steps:

a) introducing the plastic material into a hopper which contains an auger having a cutting function, b) operating the auger so as to cut the plastic material into pieces and to feed the pieces of plastic material into a chamber containing a first reciprocable piston movable in a first direction to effect compression of the pieces of plastic material and a second reciprocable piston movable in a second direction transverse to said first direction to effect further compression of the pieces of plastic material and to effect transfer of the compressed plastic material into the entry end of a chute containing a reciprocable main ram, c) coordinating control of said first and second reciprocable pistons so that, while the main ram is in its non-advanced position, each of said first and second reciprocable pistons operates through a plurality of cycles to effect the transfer of a quantity of compressed plastic material into the entry end of the chute, d) operating the main ram so that it advances along the chute to effect additional compression of the plastic material and displaces the plastic material towards the discharge end of the chute before returning to its original position, and e) interrupting operation of the auger during such operation of the main ram.

Apparatus for use in carrying out said method is also described and claimed in U.S. Pat. No. 5,494,626.

The apparatus of U.S. Pat. No. 5,494,626 operates extremely efficiently when being used for the treatment of, for example, dry polystyrene and can effect compression of about 200 kg. of dry polystyrene per hour, achieving a volume reduction of about 47:1. If, however, the polystyrene is damp, the rate of production has to be reduced and, if the polystyrene is very wet, substantial problems are encountered.

It is accordingly an object of the present invention to provide an improved method and apparatus for the treatment of expanded or foamed plastic material. More particularly, it is an object of the present invention to provide a method and apparatus for the treatment of either wet or dry expanded or foamed plastic material.

SUMMARY OF THE INVENTION

According to a first aspect of the present invention there is provided a method for the treatment of expanded or foamed plastic material, said method comprising the following steps:

a) introducing the plastic material into a hopper which contains a first auger having a cutting function, b) operating the first auger so as to cut the plastic material into pieces and to feed the pieces of plastic material into a first chamber containing a second auger, c) operating the second auger so as to feed the pieces of plastic material into a second chamber and to effect a predetermined degree of compression of the plastic material in said second chamber, and d) operating a hydraulic ram to compress the plastic material and to displace it from said second chamber into a friction chute along which the compressed plastic material is caused to travel as a result of successive operations of the hydraulic ram.

The first and second augers are preferably operated together until the achievement of the predetermined degree of compression of the plastic material is sensed. The second auger is preferably operated by means of an electric motor fitted with a current sensor unit, the arrangement being such that, when the auger motor current reaches a predetermined value, corresponding to said predetermined degree of compression of the plastic material, the sensor unit sends a signal to stop both augers, whereupon the hydraulic ram is caused to effect a forward and return stroke to compress the plastic material in said second chamber and displace it into the friction chute along which the compressed material is caused to travel.

The friction chute preferably has walls which, for a part at least of the length of the chute, can be urged towards one another to vary the pressure acting on the compressed plastic material as it is displaced along the chute. The optimum working pressure is preferably of the order of 220 to 240 bar.

The hydraulic pump which controls operation of the hydraulic ram preferably has characteristics such that the ram moves forwardly at a rate which is inversely proportional to the resistance which it encounters, i.e. the pressure which it needs to create to push the material out through the friction chute. This ensures that the plastic material is compacted with a smooth motion rather than with jerky movements which would cause stress on the machine.

The first auger is preferably arranged for rotation about a substantially horizontal axis and the second auger is preferably arranged for rotation about a substantially vertical axis, with the hopper in which the first auger is contained arranged above the friction chute through which the compressed material is discharged. The compressed material is preferably discharged along the chute in such manner that it can readily be broken into lengths for transport using standard pallets.

The friction chute is preferably vented to allow the escape of water and air from the compressed material as it is advanced along the chute.

According to a second aspect of the present invention there is provided apparatus for the treatment of expanded or foamed plastic material, said apparatus comprising:

a) a hopper into which the plastic material can be fed, b) a first auger located within the hopper, said first auger having a cutting function, c) a first chamber into which pieces of the plastic material are fed upon operation of the first auger, d) a second auger contained within said first chamber, e) a second chamber into which the pieces of plastic material are fed by the second auger, said second auger being arranged to effect a predetermined degree of compression of the plastic material fed into the second chamber, f) a friction chute communicating with said second chamber, g) a hydraulic ram arranged to compress the plastic material in the second chamber and to displace it from the second chamber into the friction chute, along which the compressed plastic material is caused to travel as a result of successive operations of the hydraulic ram, and h) control means for controlling operation of the first and second augers and the hydraulic ram.

In the "rest" or inoperative condition of the apparatus, the ram is preferably in its advanced position. Thus, when the apparatus is switched on, a motor will be operated to drive a pump which controls operation of the hydraulic ram and both augers will be stopped.

As mentioned above, the first auger is preferably arranged for rotation about a horizontal axis and the second auger is preferably arranged for rotation about a vertical axis for effecting downward feeding and compression of the pieces of plastic material.

A sensor unit is preferably provided to detect the presence of foamed or expanded plastic material within the hopper. This sensor unit preferably comprises a light source and a photocell which generates a signal when the light beam is interrupted.

On generation of this signal, the hydraulic ram is preferably retracted and, once the ram reaches its retracted position, the vertical auger is started to feed any material in the first chamber into the second chamber. A short time after the vertical auger has commenced operation, the second auger starts operating and the two augers will then run together cutting the plastic material into pieces, feeding the cut pieces out of the hopper into the chamber containing the vertical auger and then feeding the pieces downwardly and compressing them in the ram chamber.

The power required to rotate the shaft of the vertical auger will depend on the resistance which it encounters and thus on the extent to which the material fed into the ram chamber has been compressed. The electric motor driving the vertical auger is accordingly preferably provided with a current sensor unit. Thus, when the motor current reaches a predetermined value (which will be significantly less than the maximum current rating of the electrical motor and will correspond to a predetermined degree of compression of the foamed or expanded plastic material) the current sensor unit will send a signal to stop the motors driving the two augers and, once they have stopped, the hydraulic ram will be caused to advance.

If, on completion of the forward stroke of the hydraulic ram, no material is detected in the hopper, i.e. the light beam to the photo-cell is not interrupted, the hydraulic ram will remain in its forward position. A cycle of operations thus comprises the return stroke of the hydraulic ram, operation of the vertical auger and the horizontal auger (starting with the vertical auger) and then the forward stroke of the hydraulic ram. In a typical arrangement, the cycle time is about 15 seconds and an output of 100 kg. per hour of compressed wet foamed polystyrene is obtained.

DESCRIPTION OF THE PREFERRED EMBODIMENT

Figure 1:
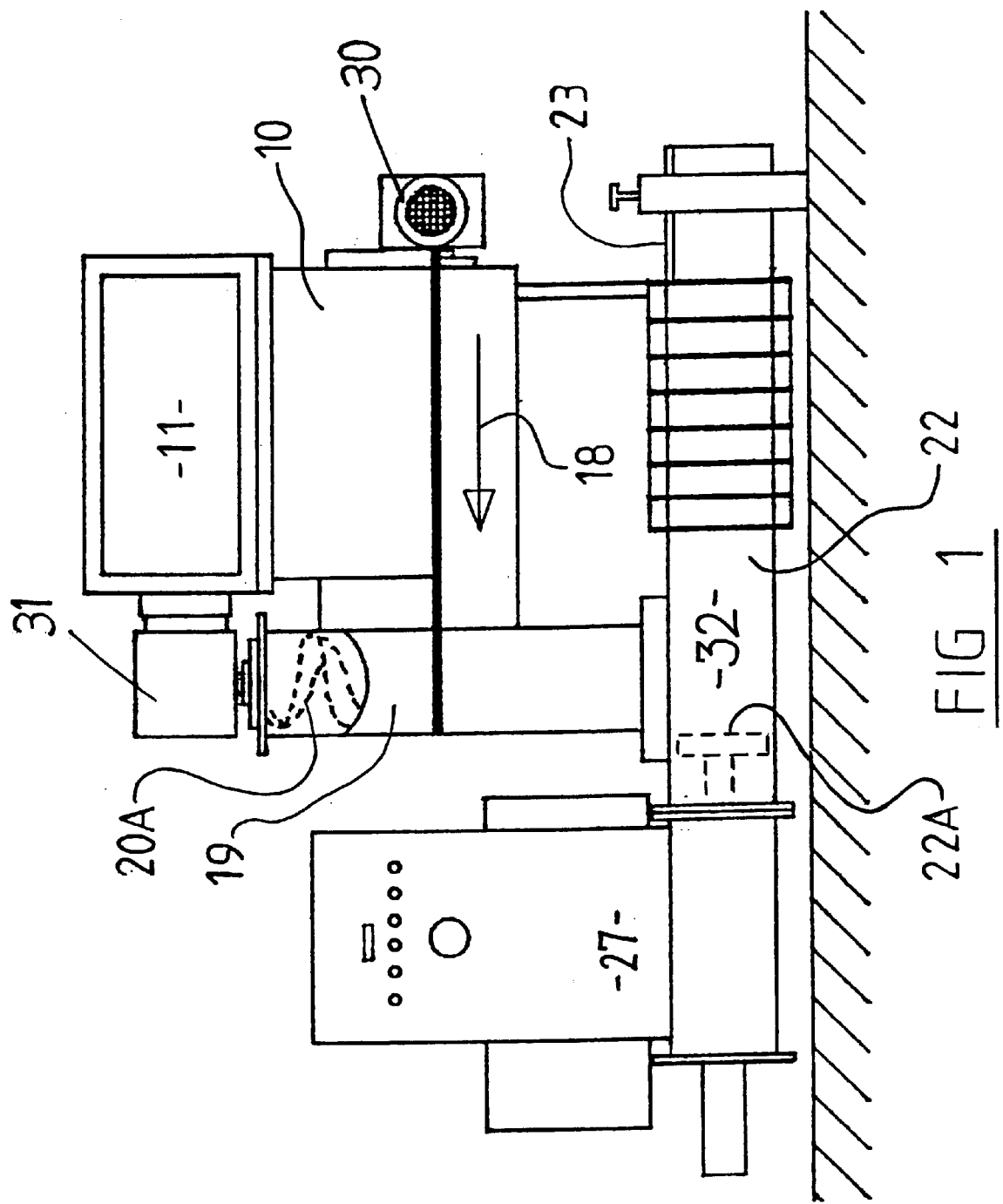
FIG. 1 is a front view of one form of apparatus in accordance with the present invention.
Figure 2:
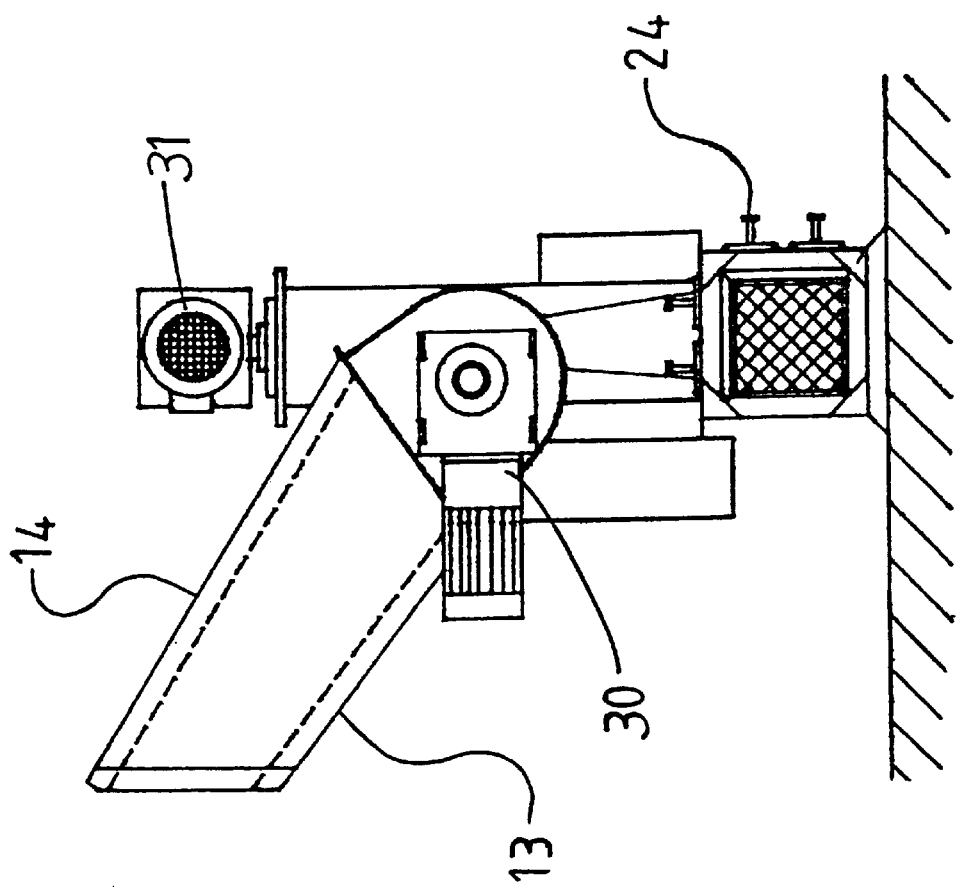
FIG. 2 is an end view of the apparatus shown in FIG. 1.
Figure 3:
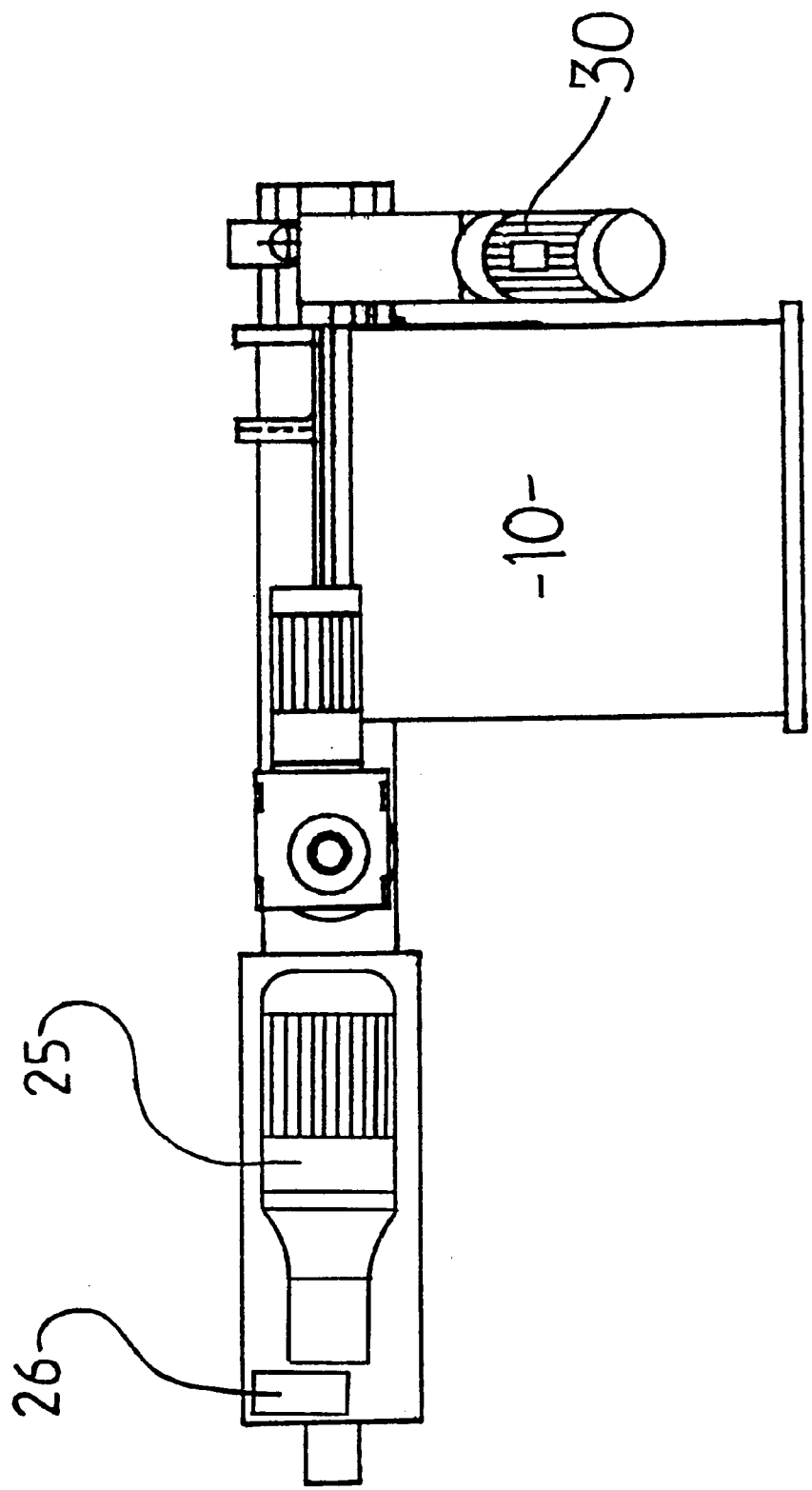
FIG. 3 is a plan view of the apparatus shown in FIG. 1.
Figure 5:
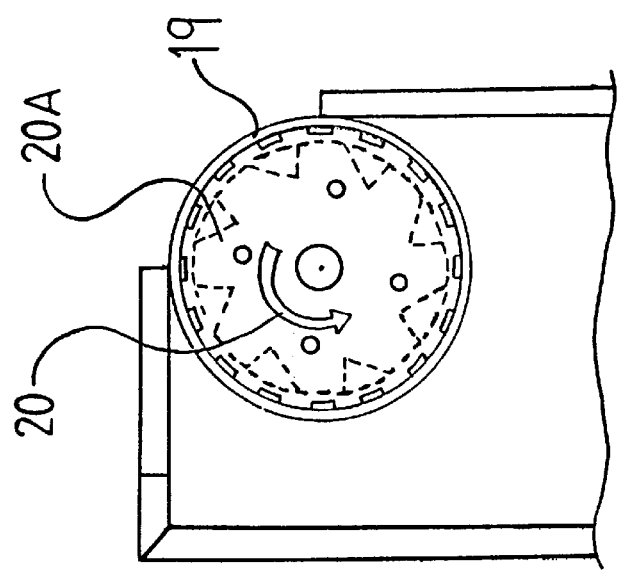
FIG. 5 is a sectional view through the chamber containing the vertical auger.

The apparatus shown in the drawings includes a hopper 10 into which articles formed from expanded or foamed plastic material, particularly expanded polystyrene, are fed in the direction indicated by the arrow 16. The plastic material can be dry, damp or very wet, for examples, boxes used in the transport of fish just after they have been hosed down.

The hopper 10 has an open mouth 11 and contains an auger 12 driven by an electric motor 30. The auger 12 is arranged to rotate about a horizontal axis and carries a number of cutting elements or blades arranged so that, as the auger 12 rotates, the cutting elements or blades subject the expanded or foamed plastic articles to a cutting action and effectively cut the articles into pieces having a maximum size similar to that of a tennis ball, or slightly larger than a tennis ball.

The hopper 10 has side walls 13 and 14 which are inclined to the vertical and the height of the lower edge of the mouth 11 is such that an operator can readily insert the plastic articles into the mouth 11 so as to fall towards the base of the hopper 10. The base of the hopper 10 is of curvate form, as shown in FIG. 4, and, as can be seen from FIG. 4, the walls 13 and 14 are not parallel to one another but diverge slightly, i.e. by about 15°, in the direction away from the curvate base of the hopper 10.

Figure 4:
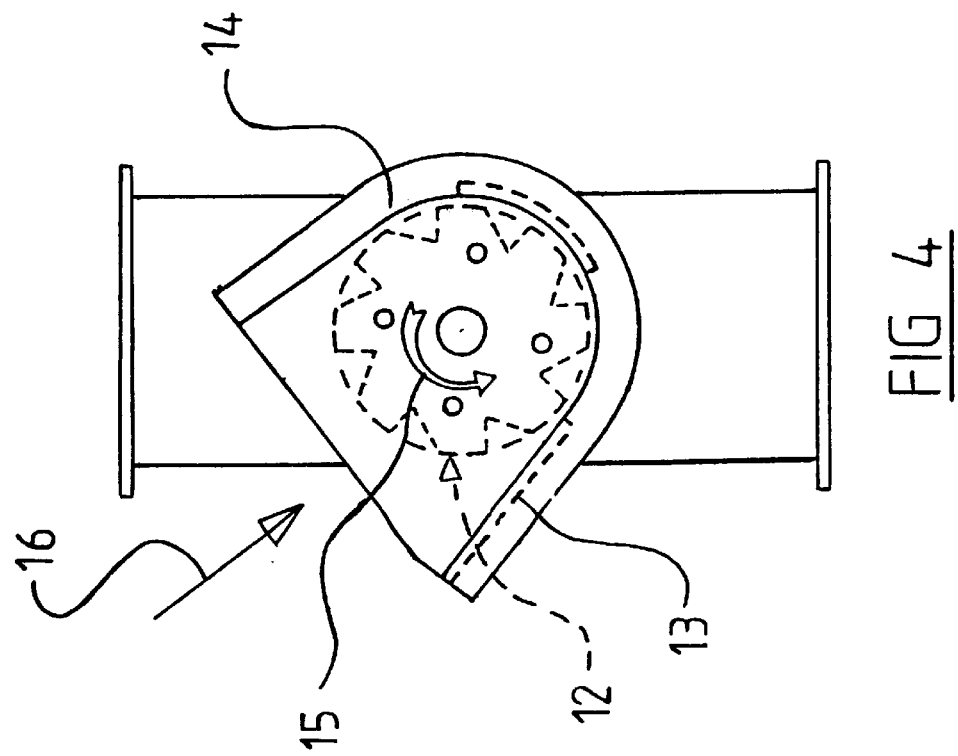
FIG. 4 is a sectional view through the hopper containing the horizontal auger.

The auger 12 rotates in the direction indicated by the arrow 15 in FIG. 4 about an axis which, looking in the direction indicated by the arrow 16, is not located centrally of the plane of the open mouth 11 of the hopper 10. Thus, as the plastic articles are introduced into the hopper 10, they will tend to fall to the left of the axis of the auger 12 as viewed in FIG. 4, such tendency being assisted by gravity, and thereby enhancing the cutting action effected by the cutting elements or blades on the auger 12.

The cut pieces of plastic material are advanced by the auger 12 in the direction indicated by the arrow 18 in FIG. 1 so as to be discharged from the hopper 10 into a vertical chamber 19 which contains an auger 20A arranged for rotation about a vertical axis in the direction indicated by the arrow 20.The auger 20A is driven by means of a motor 31 which is provided with a current sensing unit which measures the current supplied to the motor 31 and transmits a signal resulting in stopping of the motor 31 when the supplied current reaches a predetermined value (which is less than the maximum current rating of the motor 31).

The vertical chamber 19 communicates, at its lower end, with a chamber 32 which serves as the inlet end of a horizontal friction chute 22. The shaft of the vertical auger 20A finishes clear of the chamber 32 so that it does not interfere with the movement of a hydraulic ram 22A which is arranged for forward and return movement to propel the compressed plastic material along the chute 22 and to complete its compression. The top wall 23 of the end part of the friction chute 22 can be urged downwardly by means of a bolt and the front wall of the end part of the chute can be displaced rearwardly, to increase the frictional grip on the compressed material being urged along the chute 22, by means of bolts 24.

Operation of the apparatus is controlled from a control unit 27 which includes a microprocessor and a series of control relays which control operation of the electric motors 30 and 31 and a further motor 25 which drives a hydraulic pump which operates the ram 22A to move it in either the forward or return direction via a bi-directional valve 26. The hopper 10 contains a light source and a photocell (not shown) arranged so that operation of the apparatus can only start when foamed or expanded plastic material is present in the hopper 10.

In the "at rest" condition of the apparatus, the hydraulic ram 22A is in its forward position, i.e. to the right of that shown in FIG. 1. When the apparatus is switched on and plastic material is present in the hopper 10, the hydraulic ram 22A will be retracted and then the vertical auger 20A will be driven by motor 31 to effect downward displacement of any plastic material in the chamber 19. Shortly after the motor 31 has started, the motor 30 for the horizontal auger 12 will be started to break up the plastic material in the hopper 10 and to start conveying it into the vertical chamber 19 where it is displaced downwardly by the vertical auger 20A, The continued downward movement of the plastic material within the vertical chamber 19 causes the plastic material to be compressed against the base of the chute 22 squeezing out any water present in the plastic material as a result of the gradual compression of the plastic material under the action of the auger 20A. The water will escape through vent openings in the side walls of the chute 22.

The resistance to movement of the vertical auger 20A, and thus the power required to drive the vertical auger 20A, will depend on the extent to which the plastic material at the bottom of the vertical chamber 19 has been compressed. There will thus be a steady increase in the current supplied to the motor 31. When this current reaches the value set for the current sensor unit, a signal will be transmitted to cause both motors 30 and 31 to stop and continued feeding of the plastic material by the augers 12 and 20A will be interrupted.

At the same time as the signal is sent to stop the motors 30 and 31, the control unit will send a signal to the motor 25 which drives the hydraulic pump for the ram 22A. The ram 22A will thus be caused to advance, compressing the plastic material at the bottom of the vertical chamber, squeezing out any remaining water in the compressed plastic material and propelling the compressed plastic material forwardly along the chute 22. The controls for the pump driving the hydraulic ram 22A are so set that the speed of advance of the ram 22A is inversely proportional to the resistance it encounters. The ram 22A will thus move forward rapidly for the first part of its stroke and then gradually more slowly as it completes its stroke and the back pressure generated by compression of the plastic material steadily increases.

At the end of its forward stroke, the ram 22A will remain in its forward position unless there is plastic material present in the hopper 10, in which case the light beam of the photocell will be interrupted and a further cycle of operations will be initiated.

The extent to which the plastic material is compacted can be varied by manual adjustment of the bolts 24 acting on the front wall of the chute 22, the bolts 24 typically being set to create a pressure of 220 to 240 bar, which is the optimum working pressure for foamed polystyrene.

One section of the chute 22 may be provided with external heating elements set at a temperature (which may be adjustable) within the range of from 100 to 120° C. This heating section is of advantage when treating very wet foamed material since it will cause a degree of melting of the outside layers of material being forced along the chute 22. The melted material will then bond together as the material passes further along the chute 22.

The heating elements will be switched on at the beginning of a cycle of operations of the machine and initiation of the other operations of the machine will be delayed for the short time that it takes the heated section of the chute 22 to reach the required temperature. The provision of the heated section will increase the bonding of the material and will reduce the tendency of the material being discharged from the chute 22 to crumble.

The degree of compaction will depend, to some extent, on the water content of the foamed plastic material. The end product obtained by compacting dry foamed polystyrene will be of greater density than that obtained by compacting wet foamed polystyrene but, even when very wet material is used, the apparatus can be set to operate continuously, i.e. with one cycle of operations following immediately after another, and will produce material suitable to be sent for re-cycling.

What is claimed is:

1. Apparatus for the treatment of expanded or foamed plastic material, said apparatus comprising:

a) a hopper into which the plastic material is fed, b) a first auger located within the hopper, said first auger having a cutting function, c) a first chamber into which pieces of the plastic material are fed upon operation of the first auger, d) a second auger contained within said first chamber, e) a second chamber into which the pieces of plastic material are fed by the second auger, said second auger being arranged to effect compression of the plastic material fed into the second chamber, f) a friction chute connected to said second chamber, g) a hydraulic ram arranged to compress the plastic material in the second chamber and ti displace it from the second chamber into the friction chute, along which the compressed plastic material is caused to travel as a result of successive operations of the hydraulic ram, and h) control means for controlling operation of the first and second augers and the hydraulic ram.

2. Apparatus as claimed in claim 1, in which said control means is such that, in the "rest" or inoperative condition of the apparatus, the ram is in its advanced position.

3. Apparatus as claimed in claim 1, in which the first auger is arranged for rotation about a horizontal axis and the second auger is arranged for rotation about a vertical axis for effecting downward feeding and compression of the pieces of plastic material.

* * * * *